(12) United States Patent
Kusaka et al.

(10) Patent No.: US 7,407,174 B2
(45) Date of Patent: Aug. 5, 2008

(54) SUSPENSION SYSTEM FOR VEHICLE

(75) Inventors: Kaoru Kusaka, Wako (JP); Tomoyuki Shinmura, Wako (JP); Suguru Ito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 8 days.

(21) Appl. No.: 11/380,132

(22) Filed: Apr. 25, 2006

(65) Prior Publication Data

US 2006/0244235 A1 Nov. 2, 2006

(30) Foreign Application Priority Data

Apr. 28, 2005 (JP) ............................. 2005-133336

(51) Int. Cl.
*B60G 7/00* (2006.01)
(52) U.S. Cl. .............................................. 280/124.136
(58) Field of Classification Search ............. 280/5.521, 280/86.75, 86.751, 124.135, 124.136
See application file for complete search history.

(56) References Cited

U.S. PATENT DOCUMENTS

| 3,118,687 | A | * | 1/1964 | Forbush ............... 280/124.136 |
| 4,522,418 | A | * | 6/1985 | Struck et al. ........... 208/93.507 |
| 4,657,271 | A | * | 4/1987 | Salmon ................ 280/124.139 |
| 5,431,429 | A | * | 7/1995 | Lee ....................... 280/124.139 |
| 5,560,637 | A | | 10/1996 | Lee |
| 5,620,199 | A | * | 4/1997 | Lee .......................... 280/5.521 |
| 5,700,025 | A | | 12/1997 | Lee |
| 6,182,979 | B1 | * | 2/2001 | Lee .......................... 280/5.507 |
| 2002/0125674 | A1 | * | 9/2002 | Walker ................ 280/124.106 |

FOREIGN PATENT DOCUMENTS

| DE | 693 20 325 | 1/1999 |
| DE | 695 20 682 | 11/2001 |
| JP | 02-057413 | 2/1990 |

\* cited by examiner

*Primary Examiner*—Kevin Hurley
*Assistant Examiner*—Robert A. Coker
(74) *Attorney, Agent, or Firm*—Rankin, Hill & Clark LLP

(57) ABSTRACT

A vehicular suspension system is provided which includes upper and lower arms connected to a vehicle body in such a manner as to pivot in an up-and-down direction. The upper arm and the lower arm retain upper and lower portions of a knuckle, respectively. The suspension system includes retention mechanisms for retaining the upper and lower arms in such a manner as to allow the upper and lower arms to shift in a lateral direction of the vehicle body, and conversion mechanisms for converting pivotal movements of the upper and lower arms in the up-and-down direction into displacements of the upper and lower arms in the lateral direction of the vehicle body.

6 Claims, 12 Drawing Sheets

SUSPENSION SYSTEM FOR VEHICLE

FIELD OF THE INVENTION

The present invention relates to a suspension system for a vehicle, including upper and lower arms retaining knuckles in such a manner as to allow pivotal movements of the knuckles.

BACKGROUND OF THE INVENTION

Suspension systems of the type described are known from, for example, JP-A-2-57413. A suspension system disclosed in JP-A-2-57413 is provided as a double wishbone suspension including upper and lower arms retaining knuckles in such a manner as to allow pivotal movements of the knuckles. The suspension system of this type will be explained with reference to FIG. 16.

FIG. 16 is a view schematically showing a right half of a vehicle body 201 of a vehicle 200 including conventional right and left double wishbone suspensions (only right one shown and designated at 210).

The suspension 210 suspends a right wheel 214 from the vehicle body 201. The suspension 210 includes upper and lower arms 211, 212, connected to a right side of the vehicle body 201 in such a manner as to pivot up and down, and a knuckle 213 connected to respective distal ends of the upper and lower arms 211, 212.

When the vehicle 200 turns leftward, a damper or a spring of the right suspension 210 is compressed while a damper or a spring of the left suspension is stretched because the vehicle 200 is subjected to a centrifugal force. As a result, the vehicle 200 causes a body roll, namely, the vehicle body 201 leans rightward such that the right side of the vehicle body 201 is lowered while a left side of the vehicle body 201 is lifted up. It is to be noted that, when the vehicle 200 turns leftward, the right wheel 214 is an outside wheel while a left wheel (not shown) is an inside wheel.

The body roll of the vehicle 200 is geometrically defined by arrangement of suspension links (suspension arms). The vehicle body 201 rolls on a roll center RC2.

As shown in FIG. 16, the right wheel 214 has a contact point Pg2 contacting a ground surface GL. A roll center height Hr2 is defined as a distance between the ground surface GL and the roll center RC2. A line Li2 passes through the point Pg2 and the roll center RC2. The line Li2 is inclined at an angle θ2 relative to the ground surface GL.

When the right wheel 214 pivots upward relative to the vehicle body 201, the contact point Pg2 of the right wheel 214 is shifted laterally outwardly of the vehicle body 201. The contact point Pg2 then moves about the roll center RC2 in an arcuate line Lg2 extending upwardly outwardly of the vehicle body 201. This results in relatively great roll center height Hr2.

A cornering force (sideways force) CF2 is produced at the contact point Pg2 of the right wheel 214. The cornering force CF2 includes a component (called "horizontal component") Fs2 directed towards the roll center RC2 and a component (called "vertical component") Fg2 directed towards the ground surface GL. These two components Fs2, Fg2 each correspond in magnitude to the angle θ2. The component Fs2 is applied to the suspension 210. A reaction force of the component Fg2 acts in such a direction as to lift up the wheel 214. The component Fg2 can be generally expressed by the following equation:

$$Fg2 = CF2 \times \sin\theta 2.$$

Since the angle θ2 is relatively great, the component Fg2 is great, too. That is, the reaction force becomes large. It is necessary to reduce the reaction force acting in such a direction as to lift up the wheel 214.

The suspension 210 is disposed to provide a wheel alignment designed such that a tire of the right wheel 214 is disposed perpendicular to the ground surface GL. In other words, the wheel 214 is arranged to provide an increased negative camber when the suspension 210 shifts upwardly.

However, since links of the double wishbone suspension 210 are arranged in such a manner as to provide the increased negative camber of the wheel 214, the roll center height Hr2 is rendered large. This results in a large component Fg2. That is, a large reaction force of the large component Fg2 acts on the right wheel 26 in such a direction as to lift up the right wheel 26. Thus, a pressure applied from the ground surface GL to the tire of the right (outside) wheel 214 is abruptly increased while a pressure applied from the ground surface GL to a tire of the left (inside) wheel is abruptly decreased. As a result, a load applied to the right wheel 214 is abruptly increased. A total grip of the tires of the right and left wheels would be abruptly decreased since the tire has a property of providing a very small grip when an excessively large load is applied to the tire. Thus, it is difficult to provide optimized tire grips. Moreover, it is difficult to improve a damping function of the suspension 210 when the vehicle 200 makes a left turn.

The reason why the above problem occurs is that, when the suspension 210 shifts upwardly, the upper arm 211 draws an upper part of the tire of the wheel 214 inwardly of the vehicle body 201 while the lower arm 212 retains or pushes a substantially central portion of the tire of the wheel 214 outwardly of the vehicle body 201 such that the contact point Pg2 of the wheel 214 is displaced laterally outwardly of the vehicle body 201 and then moves in the acuate line Lg2.

To address the problem, there is a need to provide: (1) a suitable camber for efficient contact between a wheel and a ground surface; and (2) an appropriate roll center height determining how much a load applied to each of right and left wheels is varied during turning of a vehicle.

SUMMARY OF THE INVENTION

According to an aspect of the present invention, there is provided a suspension system for a vehicle, which comprises: a knuckle for rotatably retaining a wheel of the vehicle; an upper arm vertically pivotally connected to a body of the vehicle for retaining an upper portion of the knuckle; a lower arm vertically pivotally connected to the vehicle body for retaining a lower portion of the knuckle; retention means for retaining the upper arm and the lower arm movably laterally of the vehicle body; and conversion means for converting the vertical pivotal movements of the upper arm and the lower arm into lateral displacements.

The suspension system of the present invention has an advantage that a contact point of the wheel contacting a ground surface is not displaced laterally outwardly of the vehicle body when the wheel pivots upwardly relative to the vehicle body. The contact point of the wheel moves in a line extending in a generally vertically upward direction. Namely, the wheel pivots relative to the vehicle body towards an area located substantially directly above the contact point of the wheel. A roll center height defined as a distance between the ground surface and a roll center can be rendered small.

The retention means retains the upper arm in such a manner as to allow the upper arm to shift in the lateral direction of the vehicle body while the conversion means draws the upper arm towards the vehicle body. The lower arm is drawn a smaller amount towards the vehicle body than the upper arm. Thus, the wheel provides a negative camber during leftward turning or cornering of the vehicle if the wheel is a right wheel. Likewise, if the wheel is a left wheel, the wheel provides a negative camber during rightward turning or cornering of the vehicle. In other words, a camber of the wheel becomes negative while the contact point of the wheel moves in the line extending in the generally vertically upward direction during the upward pivotal movement of the wheel relative to the vehicle body.

The arrangement of the suspension system of the present invention provides the following two advantages: (1) The wheel has a suitable camber for efficient contact with the ground surface. (2) The roll center height determining how much a load applied to the wheel is varied during turning of the vehicle is rendered small. The vehicle including the suspension system of the present invention can exhibit a high performance or run more stably. In addition, a tire wear of the wheel can be reduced.

In short, the suspension system provides an advantage that a tire tread of the wheel can uniformly contact the ground surface when the vehicle turns. Thus, the following four advantages can be obtained:

(i) The tire exhibits its own performance to the full when the vehicle turns, such that the vehicle can run stably or be steered readily.

(ii) A load applied to the wheel is varied a smaller amount when the vehicle begins to turn, such that the vehicle can turn stably.

(iii) When the vehicle brakes, the vehicle provides a short braking distance, such that the vehicle can avoid colliding with another vehicle.

(iv) When the vehicle turns, the tire does not partially contact the ground surface. Because such a partial contact of the tire with the ground surface is not made, the tire does not wear off in a short period of time. As a result, the tire can provide a prolonged life and contribute to saving resource used for producing tires.

The suspension system of the present invention is arranged such that the upper arm and the lower arm pivot less sharply. Thus, the suspension system including such upper and lower arms can be small in size. In such a case, the vehicle including the suspension system can provide an enlarged passenger compartment and an enlarged luggage compartment. Also, the suspension system can provide the above four advantages (i), (ii), (iii) and (iv) even if the suspension system is used in a small-sized vehicle.

Preferably, the conversion means comprises a camber control arm for connecting at least one of vehicle-body-side ends of the upper and lower arms to the vehicle body, and wherein the camber control arm is pivotable in such a direction as to draw the upper- and lower-arm ends toward the vehicle body in response to the vertical pivotal movements of the upper and lower arms.

In a preferred form, the upper and lower arms have an intermediate portion, at least one of the intermediate portions forming an engaging projection of the retention means, and wherein the vehicle body has an elongated hole for allowing engagement of the engaging projection movably laterally of the vehicle body.

Preferably, the vehicle body has an engaging projection forming the retention means, and wherein the upper and lower arms have an intermediate portion, at least one of the intermediate portions having an elongated hole for allowing engagement of the engaging projection movably laterally of the vehicle body.

Desirably, the retention means comprises a swing arm for connecting at least one of intermediate portions of the upper arm and the lower arm to the vehicle body, and wherein the swing arm is pivotable in such a manner as to move the intermediate portion laterally of the vehicle body in response to the vertical pivotal movements of the upper and lower arms.

Preferably, the retention means comprises a first rubber portion for retaining an intermediate portion of one of the upper and lower arms, the first rubber portion being elastically deformable only in a longitudinal direction of the one of the upper and lower arms, and wherein the conversion means comprises a second rubber portion for retaining one of vehicle-body-side ends of the upper and lower arms, the second rubber portion being elastically deformable only in the lateral direction of the vehicle body, the first rubber portion and the second rubber portion being formed integrally with each other.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Description will be made as to a vehicular suspension system in a first embodiment of the present invention with reference to FIG. 1 through FIG. 5.

Figure 1:
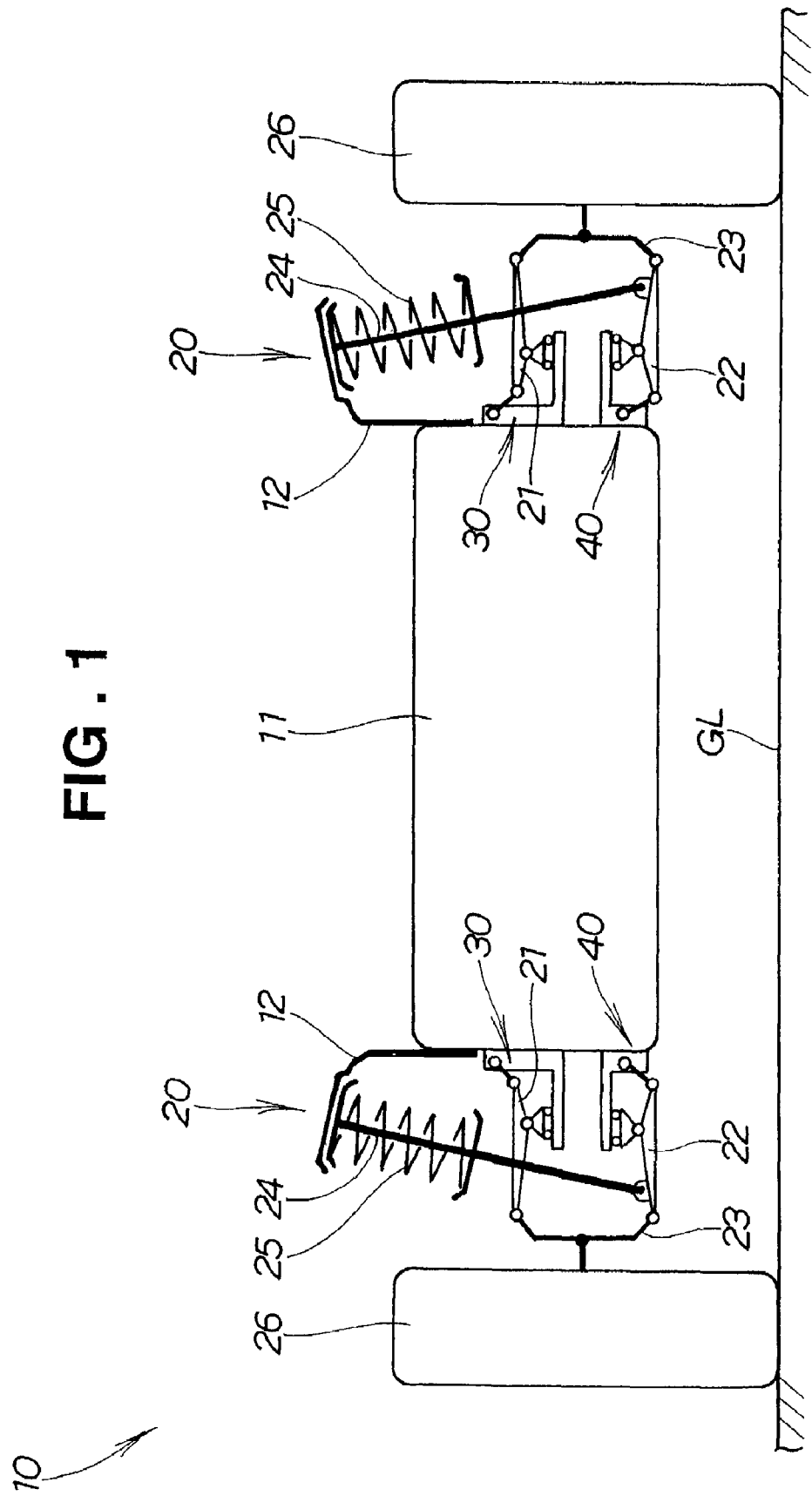
FIG. 1 is a schematic view of right and left vehicular suspension systems in a first embodiment of the present invention.

As shown in FIG. 1, a vehicle 10 includes right and left damper housings 12, 12 at upper portions of a vehicle body 11 (including subframes). The vehicle body 11 has right and left sides equipped with right and left independent suspension systems 20, 20, respectively.

Figure 2:
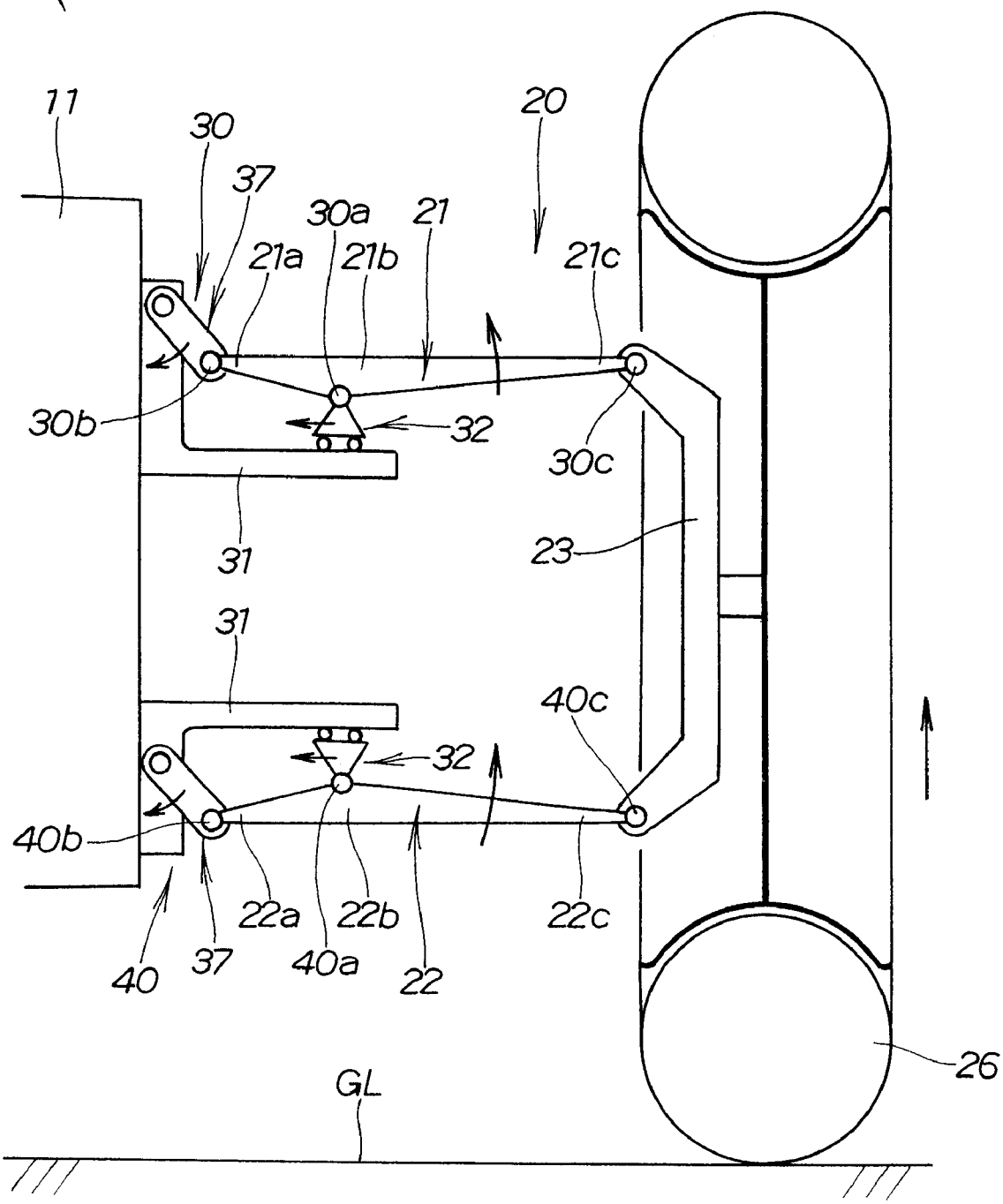
FIG. 2 is a schematic view of the right suspension system shown in FIG. 1.

As shown in FIG. 1 and FIG. 2, the right suspension system 20 is provided as a double wishbone suspension including upper and lower arms 21, 22 connected to the right side of the vehicle body 11 in such a manner as to pivot in an up-and-down direction, a knuckle 23 connected to respective distal end portions 21c, 22c of the upper and lower arms 21, 22, a damper 24 located between and attached to the damper housing 12 and the lower arm 22, and a coil spring 25 disposed between the damper housing 12 and the lower arm 22.

The upper arm 21 has a proximal end portion 21a connected to the vehicle body 11 through an upper connecting unit 30. The lower arm 22 has a proximal end portion 22a connected to the vehicle body 11 through a lower connecting unit 40. The knuckle 23 of the right suspension system 20 retains a right wheel 26 in such a manner as to allow rotation of the right wheel 26. Similarly, a knuckle 23 of the left suspension system 20 retains a left wheel 26 in such a manner as to allow rotation of the left wheel 26. The knuckle 23 has an upper portion retained by the distal end portion 21c of the upper arm 21, and a lower portion retained by the distal end portion 22c of the lower arm 22.

By virtue of the right and left suspension systems 20, 20, the right and left wheels 26, 26 are independently suspended on the vehicle body 11. It is to be noted that the left suspension system 20 is identical in arrangement to the right suspension system 20, except they are disposed symmetrically, and hence description of the left suspension system 20 will be omitted. The right and left suspension systems 20, 20 can be used as front suspension systems or rear suspension systems.

Figure 3:
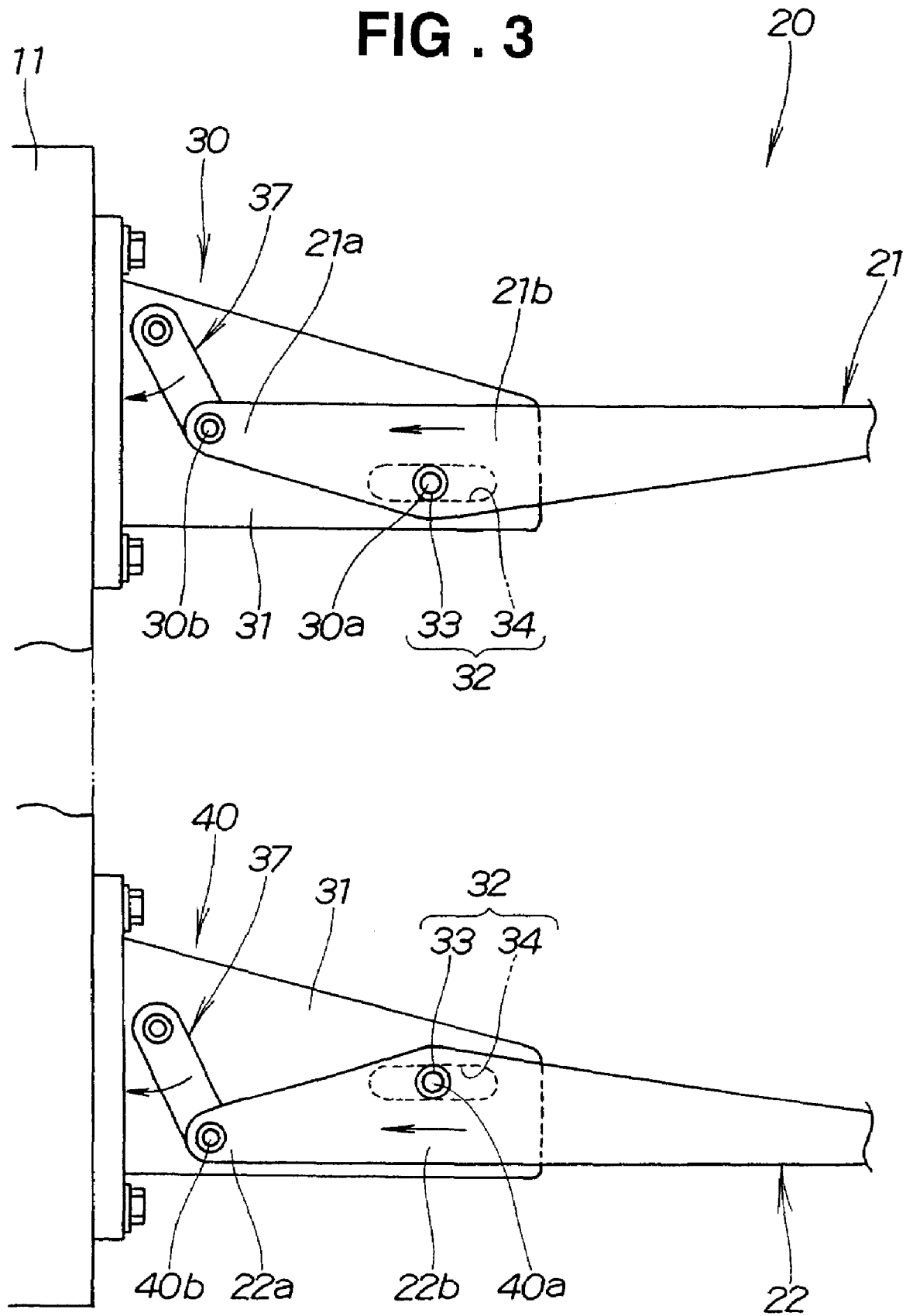
FIG. 3 is a view showing an arrangement of each of retention means and conversion means shown in FIG. 2.

As shown in FIGS. 2 and 3, the upper connecting unit 30 includes a bracket 31 attached to the vehicle body 11, retention means 32, and conversion means 37. The retention means 32 is provided as a mechanism for retaining the upper arm 21 in such a manner as to allow the upper arm 21 to shift in a lateral direction of the vehicle body 11 (in a right-and-left direction of a sheet of FIG. 3). The conversion means 37 is provided as a mechanism for converting pivotal movement (displacement) of the upper arm 21 in the up-and-down direction into displacement of the upper arm 21 in the lateral direction of the vehicle body 11.

The retention means 32 and the conversion means 37 are assembled to the bracket 31. In other words, the retention means 32 and the conversion means 37 are assembled to the vehicle body 31 by means of the bracket 31.

As shown in FIG. 3, the retention means 32 includes an engaging projection 33, and an elongated hole 34 within which the engaging projection 33 is retained in such a manner as to shift in the lateral direction of the vehicle body 11. The engaging projection 33 is provided on an intermediate portion 21b of the upper arm 21. The intermediate portion 21b is located closer to the middle of the upper arm 21 than the proximal end portion 21a. The engaging projection 33 is provided as, for example, a roller rotatably attached to a side surface of the intermediate portion 21b of the upper arm 21. The elongated hole 34 is provided on a side surface of the bracket 31 and extends substantially horizontally in the lateral direction of the vehicle body 11.

The retention means 32 may be altered such that the engaging projection 33 is provided on the bracket 31 while the elongated hole 34 is provided on the intermediate portion 21b of the upper arm 21.

As shown in FIG. 3, the conversion means 37 is provided as a camber control arm interconnecting the proximal end portion 21a of the upper arm 21 and the bracket 31.

The camber control arm 37 is pivotable in such a direction as to draw the proximal end portion 21a of the upper arm 21 towards the vehicle body 11 in response to pivotal movement of the upper arm 21 in the up-and-down direction. The camber control arm 37 is a downwardly elongated member, and is connected at a proximal end portion thereof to the side surface of the bracket 31 and at a distal end portion thereof to the proximal end portion 21a of the upper arm 21. The camber control arm 37 pivots in the lateral direction of the vehicle body 11. The camber control arm 37 and the upper arm 21 are pivotable relative to each other.

A point 30a of connection of the engaging projection 33 and the elongated hole 34 is located lower than a point 30b of connection of the distal end portion of the camber control arm 37 and the proximal end portion 21a of the upper arm 21. The point 30a will be referred to as "upper connection point 30a of the retention means 32". The point 30b will be referred to as "upper connection point 30b of the conversion means 37".

As shown in FIG. 2 and FIG. 3, the lower connecting unit 40 has basically the same arrangement as the upper connecting unit 30. More specifically, the lower connecting unit 40 includes retention means 32 retaining the lower arm 22 in such a manner as to allow the lower arm 22 to shift in the lateral direction of the vehicle body 11, and conversion means 37 for converting pivotal movement (displacement) of the lower arm 22 in the up-and-down direction into displacement of the lower arm 22 in the lateral direction of the vehicle body 11. The retention means 32 and the conversion means 37 of the lower connecting unit 40 are attached through the bracket 31 to the vehicle body 11.

A point 40a of connection of an engaging projection 33 and an elongated hole 34 of the retention means 32 of the lower connecting unit 40 is located higher than a point 40b of connection of a distal end portion of a camber control arm 37 and the proximal end portion 22a of the lower arm 22. The point 40a will be referred to as "lower connection point 40a of the retention means 32". The point 40b will be referred to as "lower connection point 40b of the conversion means 37".

The retention means 32 and the conversion means 37 are assembled to the bracket 31. In other words, the retention means 32 and the conversion means 37 are assembled to the vehicle body 11 by means of the bracket 31.

In FIG. 2, a point 30c of connection of the distal end portion 21c of the upper arm 21 and the upper portion of the knuckle 23 will be referred to as "upper connection point 30c of the knuckle 23". A point 40c of connection of the distal end portion 22c of the lower arm 22 and the lower portion of the knuckle 23 will be referred to as "lower connection point 40c of the knuckle 23". The upper connection point 30c of the knuckle 23 is located higher than the upper connection point 30a of the retention means 32. The lower connection point 40c is located lower than the lower connection point 40a of the retention means 32.

A level of the upper connection point 30b of the conversion means 37 and a level of the upper connection point 30c of the knuckle 23 relative to a level of the upper connection point 30a of the retention means 32 are appropriately set for optimal operation of the suspension system 20. A level of the lower connection point 40b of the conversion means 37 and a level of the lower connection point 40c of the knuckle 23 relative to a level of the lower connection point 40a of the retention means 32 are appropriately set for optimal operation of the suspension system 20.

It is to be noted that the bracket 31, the engaging projection 33, the elongated hole 34, and the camber control arm 37 of the upper connecting unit 30 are identical or generally identical in dimension to those of the lower connecting unit 40. The upper and lower arms 21, 22 are arranged to be in horizontal or generally horizontal positions when the vehicle body 11 is in a stationary state (i.e., the vehicle 10 stops traveling).

Figure 4:
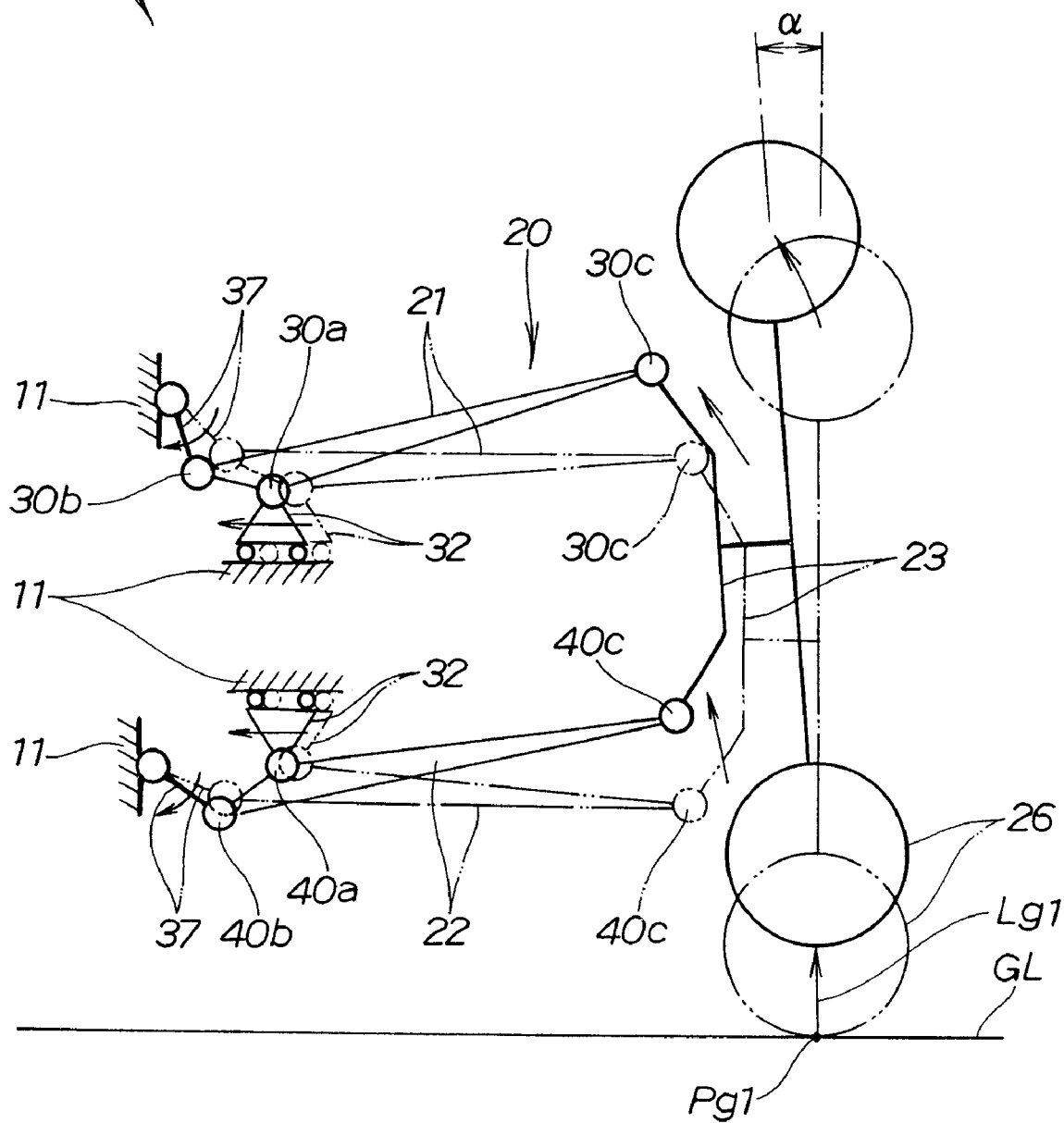
FIG. 4 is a view showing operation of the right suspension system shown in FIG. 2.

In FIG. 4, the suspension system 20 is shown by a phantom line when the vehicle body 11 is in the stationary state. The suspension system 20 shown by the phantom line in FIG. 4 is in the same position as the suspension system 20 shown in FIG. 2. The wheel 26 has a contact point Pg1 contacting a ground surface GL.

Discussion will be made as to a case where the vehicle body 11 is brought down relative to the wheel 26, for example, when the vehicle 10 makes a left turn. When the vehicle 10 turns leftward, the vehicle 10 is subjected to a centrifugal force. Under the action of the centrifugal force, the damper 24 and the spring 25 of the right suspension system 20 suspending the right wheel 26 are compressed while the damper 24 and the spring 25 of the left suspension system 20 suspending the left wheel 26 are stretched. As a result, the vehicle body 11 rolls or leans in such a manner that a right side of the vehicle body 11 is lowered while a left side of the vehicle body 11 is lifted up. In this case, the right wheel 26 is an outside wheel.

Operation of the right suspension system 20 when the vehicle 10 makes a left turn will be hereinbelow described assuming that the right (outside) wheel 26 pivots upwardly relative to the vehicle body 11, as shown in FIG. 4, for the purpose of easy understanding although, indeed, the vehicle body 11 is lowered relative to the right wheel 26.

When the right wheel 26 pivots upwardly relative to the vehicle body 11, as shown in FIG. 4, during the left turning of the vehicle 10, the upper and lower arms 21, 22 are about to pivot upwardly on the upper connection point 30a of the retention means 32 and the lower connection point 40a of the retention means 32, respectively, as shown by solid lines of FIG. 4.

At the same time, the camber control arm 37 of the upper connecting unit 30 (FIG. 3) pivots clockwise in response to the upward pivotal movement of the upper arm 21 while the camber control arm 37 of the lower connecting unit 40 (FIG. 3) pivots clockwise in response to the upward pivotal movement of the lower arm 22. These clockwise pivotal movements of the camber control arms 37, 37 draw the upper connection point 30b of the conversion means 37 and the lower connection point 40b of the conversion means 37 (that is, the proximal end portion 21a of the upper arm 21 and the proximal end portion 22a of the lower arm 22) towards the vehicle body 11.

Simultaneously, the upper connection point 30a of the retention means 32 and the lower connection point 40a of the retention means 32 (that is, the intermediate portion 21a of the upper arm 21 and an intermediate portion 22a of the lower arm 22) shifts horizontally towards the vehicle body 11. In other words, the points 30a, 40a on which the upper arm 21 and the lower arm 22 were about to pivot upwardly are displaced horizontally towards the vehicle body 11. By amounts of such displacements of the points 30a, 40a towards the vehicle body 11, amounts of displacements of the upper and lower connection points 30c, 40c of the knuckle 23 towards the vehicle body 11 are increased.

The upper connection point 30c of the knuckle 23 is located higher than the upper connection point 30a of the retention means 32. The upper connection point 30c of the knuckle 23 would be displaced towards the vehicle body 11 by a great amount when the upper arm 21 pivots upwardly even if the upper connection point 30a of the retention means 32 were not displaced at all. Indeed, however, the upper connection point 30c of the knuckle 23 is displaced towards the vehicle body 11 by a greater amount because the camber control arm 37 of the upper connection unit 30 draws the upper connection point 30c of the knuckle 23 towards the vehicle body 11.

The lower connection point 40c of the knuckle 23 is located lower than the lower connection point 40a of the retention means 32. The lower connection point 40c of the knuckle 23 would be displaced slightly laterally outwardly of the vehicle body 11 when the lower arm 22 pivots upwardly if the lower connection point 40a of the retention means 32 were not displaced at all. However, indeed, the lower connection point 40c of the knuckle 23 is displaced towards the vehicle body 11 because the camber control arm 37 of the lower connecting unit 40 draws the lower connection point 40c of the knuckle 23 towards the vehicle body 11. An amount of the displacement of the lower connection point 40c of the knuckle 23 towards the vehicle body 11 is small. The lower connection point 40c of the knuckle 23 is drawn towards the vehicle body 11 by a much smaller amount than the upper connection point 30c of the knuckle 23.

Thus, the contact point Pg1 of the wheel 26 is displaced a smaller amount than a top end of the wheel 26, such that a camber angle α of the wheel 26 is varied to provide a negative camber of the wheel 26. Consequently, the camber angle α of the wheel 26 is varied to be negative when the vehicle 10 makes a left turn.

The foregoing description can be summarized as follows.

The suspension system 20 is arranged such that the retention means 32 of the lower connecting unit 40 retains the lower arm 22 in such a manner as to allow the lower arm 22 to shift in the lateral direction of the vehicle body 11 while the camber control arm 37 of the lower connecting unit 40 draws the lower arm 22 towards the vehicle body 11.

With this arrangement of the suspension system 20, it becomes possible to prevent the contact point Pg1 of the wheel 26 from being displaced laterally outwardly of the vehicle body 11 when the wheel 26 pivots upwardly relative to the vehicle body 11. Thus, the contact point Pg1 moves in a line Lg1 extending in a generally vertically upward direction. In other words, the wheel 26 pivots to an area located generally directly above the contact point Pg1. As a result, a roll center height defined as a distance between a roll center and the ground surface GL can become lower.

Also, the suspension system 20 is arranged such that the retention means 32 of the upper connecting unit 30 retains the upper arm 21 in such a manner as to allow the upper arm 21 to shift in the lateral direction of the vehicle body 11 while the camber control arm 37 of the upper connecting unit 30 draws the upper arm 21 towards the vehicle body 11.

As can be seen from the above, the suspension system 20 is arranged such that both the upper arm 21 and the lower arm 22 are drawn towards the vehicle body 11. In designing the suspension system 20, the amount by which the lower connection point 40c of the knuckle 23 is drawn towards the vehicle body 11 is appropriately set to be smaller than the amount by which the upper connection point 30c of the knuckle 23 is drawn towards the vehicle body 11. Thus, the camber angle α of the right wheel 26 is varied to become negative when the vehicle 10 makes a left turn (during cornering of the vehicle 10).

Figure 5:
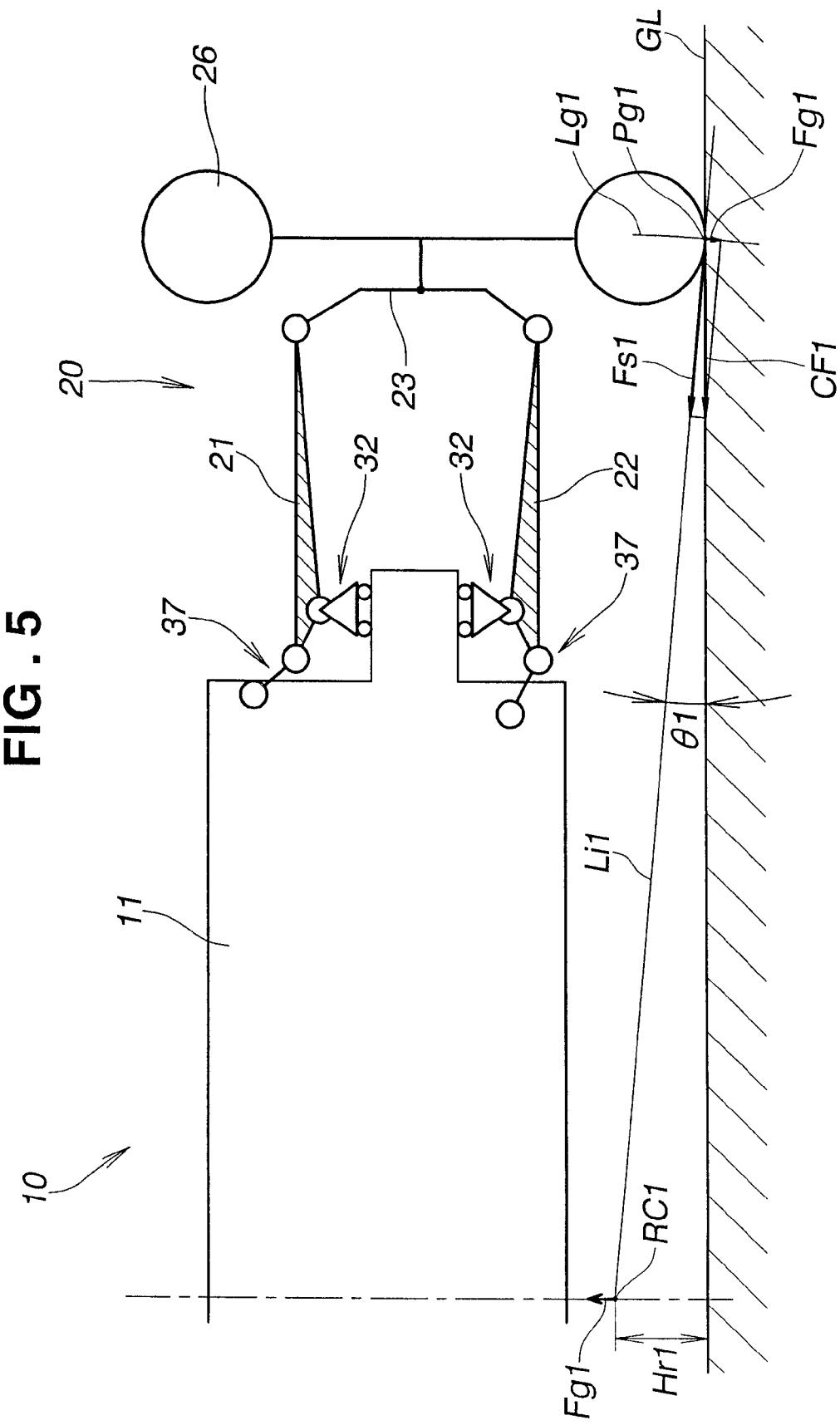
FIG. 5 is a view showing operation of the right suspension system shown in FIG. 2.

As shown in FIG. 5, a roll center height Hr1 is defined as a distance between the ground surface GL and a roll center RC1. A straight line Li1 passes through the contact point Pg1 and the roll center RC1. The line Li1 is inclined an angle θ1 relative to the ground surface GL.

When the wheel 26 pivots upwardly relative to the vehicle body 11, the contact point Pg1 moves in the line Lg1 on the roll center RC1. As explained above, the wheel 26 pivots to the area located generally directly above the point Pg1. Thus, the roll center height Hr1 can become lower, thereby rendering the angle θ1 smaller.

A cornering force CF1 is exerted on the point Pg1 of the wheel 26. The cornering force CF1 includes a component Fs1 (called "horizontal component") directed towards the roll center RC1 and a component Fg1 (called "vertical component") directed to the ground surface GL. These components Fs1, Fg1 correspond in magnitude to the angle θ1. The component Fs1 is applied to the suspension system 20. A reaction force of the component Fg1 acts on the wheel 26 in such a direction as to lift up the wheel 26.

The component Fg1 can be expressed by the following equation (1):

$$Fg1 = CF1 \times \sin \theta 1 \tag{1}$$

Since the angle θ1 is small, the component Fg1 is small, too. It is thus possible to reduce the force acting in such a direction to lift up wheel 26, thereby preventing the vehicle body 11 from being lifted up.

Referring back to FIG. 4, the camber angle a of the right wheel 26 can be expressed by the following equation (2):

$$\text{camber angle } \alpha = \sin^{-1} (2 \times St \times Hr1/Rt) \tag{2}$$

where Rt stands for a radius of the wheel 26 and St stands for an amount the wheel 26 pivots upward.

The camber angle α is set appropriately such that the right wheel 26 tilts inwardly, that is, provides a negative camber while the contact point Pg1 of the wheel 26 moves in a generally vertically upward direction perpendicular to the ground surface GL during the upward pivotal movement of the wheel 26 relative to the vehicle body 11.

It is to be noted that the conversion means 37 may be provided to interconnect the vehicle body 11 and at least one of the proximal end portions 21a, 22a of the upper and lower arms 21, 22 located on a side of the vehicle body 11.

It is also to be noted that the engaging projection 33 of the retention means 32 may be provided on at least one of the intermediate portions 21b, 22b of the upper and lower arms 21, 22 and that the elongated hole 34 of the retention means 32 may be provided on the vehicle body 11. Alternatively, the engaging projection 33 of the retention means 32 may be provided on the vehicle body 11, and the elongated hole 34 of the retention means 32 may be provided on at least one of the intermediate portions 21b, 22b of the upper and lower arms 21, 22.

Description will be made as to a suspension system in each of second, third, fourth, fifth, sixth, seventh and eighth embodiments of the present invention. Components in each of the second through eighth embodiments corresponding to those in the first embodiment will be designated by the same reference numerals and their descriptions will be omitted.

Figure 6:
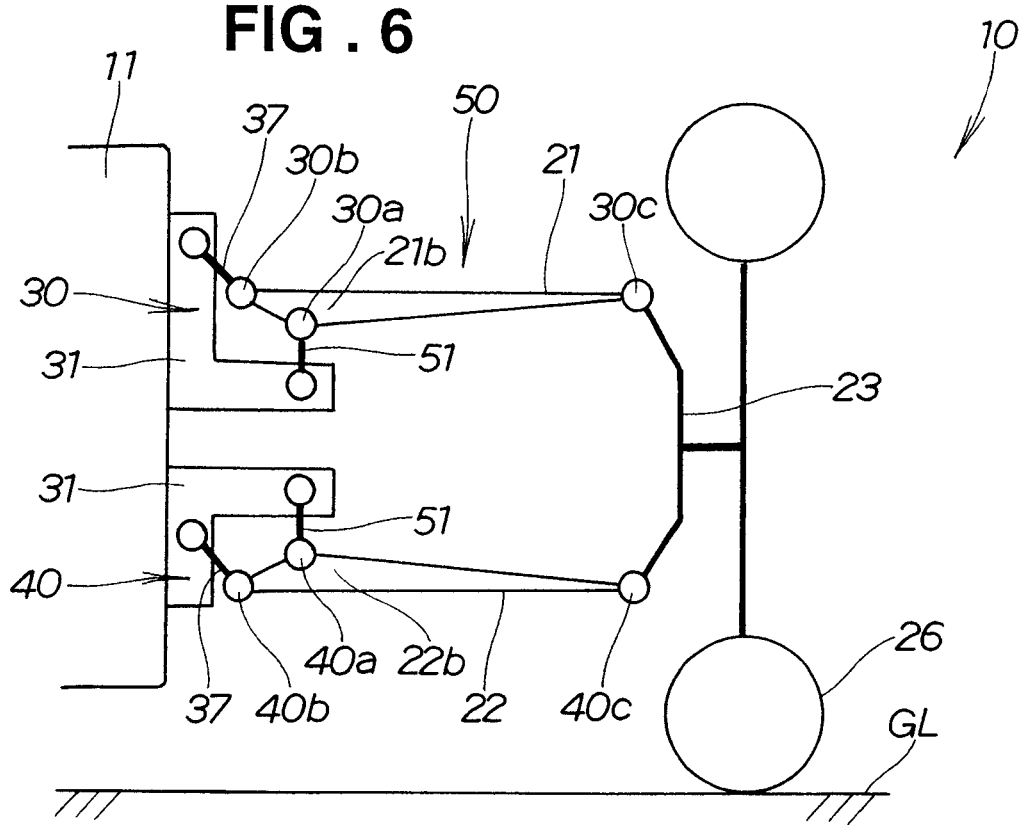
FIG. 6 is a schematic view of a right vehicular suspension system in a second embodiment of the present invention.
Figure 7:
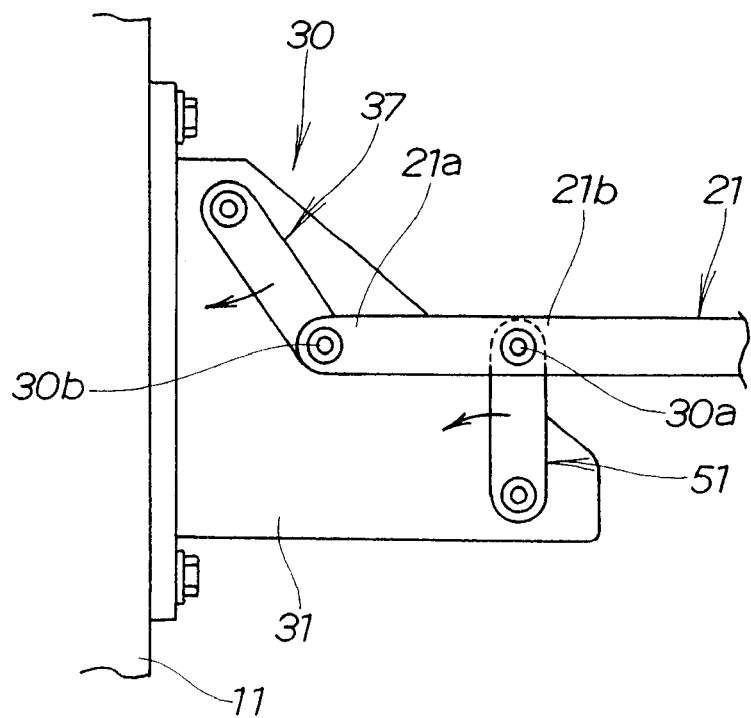
FIG. 7 is a view showing an arrangement of an upper connecting unit shown in FIG. 6.

FIG. 6 and FIG. 7 each show a vehicular suspension system 50 in the second embodiment of the present invention.

As can be seen from the suspension system 50 shown in FIG. 6, each of an upper connecting unit 30 and a lower connecting unit 40 includes retention means 51. The retention means 51 of the upper connecting unit 30 is provided as a swing arm interconnecting an intermediate portion 21b of an upper arm 21 and a bracket 31 attached to a vehicle body 11.

The retention means 51 of the lower connecting unit 40 is provided as a swing arm interconnecting an intermediate portion 22b of a lower arm 22 and a bracket 31 attached to the vehicle body 11. The swing arms 51, 51 (i.e., the retention means 51, 51 of the upper and lower connecting units 30, 40) are arranged to pivot in such a manner as to allow the intermediate portions 21b, 22b to shift in the lateral direction of the vehicle body 11 in response to pivotal movements of the upper and lower arms 21, 22 in the up-and-down direction.

The swing arm 51 of the upper connecting unit 30 extends upwardly. The swing arm 51 is connected at a proximal end portion thereof to a side surface of the bracket 31 in such a manner as to pivot in the lateral direction of the vehicle body 11. The swing arm 51 is also connected at a distal end portion thereof to the intermediate portion 21b of the upper arm 21. The upper arm 21 and the swing arm 51 are connected to each other in such a manner as to pivot relative to each other. At an upper connection point 30a of the retention means 32, the distal end portion of the swing arm 51 is connected to the intermediate portion 21b of the upper arm 21.

The swing arm 51 of the lower connecting unit 40 is identical in arrangement to the swing arm 51 of the upper connecting unit 30 except that they are provided symmetric relation each other. At a lower connection point 40a of the retention means 32, a distal end portion of the swing arm 51 is connected to the intermediate portion 22b of the lower arm 22.

The suspension system 50 in the second embodiment is operated in the same manner as the suspension system 20 in the first embodiment.

In the suspension system 50, each of the upper and lower connecting units 30, 40 includes the bracket 31, the retention means (swing arm) 51 assembled to the bracket 31, and the conversion means 37 assembled to the bracket 31. In other words, the retention means 51 and the conversion means 37 are assembled to the vehicle body 11 by means of the bracket 31.

The retention means 51 may be provided to interconnect the vehicle body 11 and at least one of the intermediate portions 21b, 22b of the upper and lower arms 21, 22.

Figure 8:
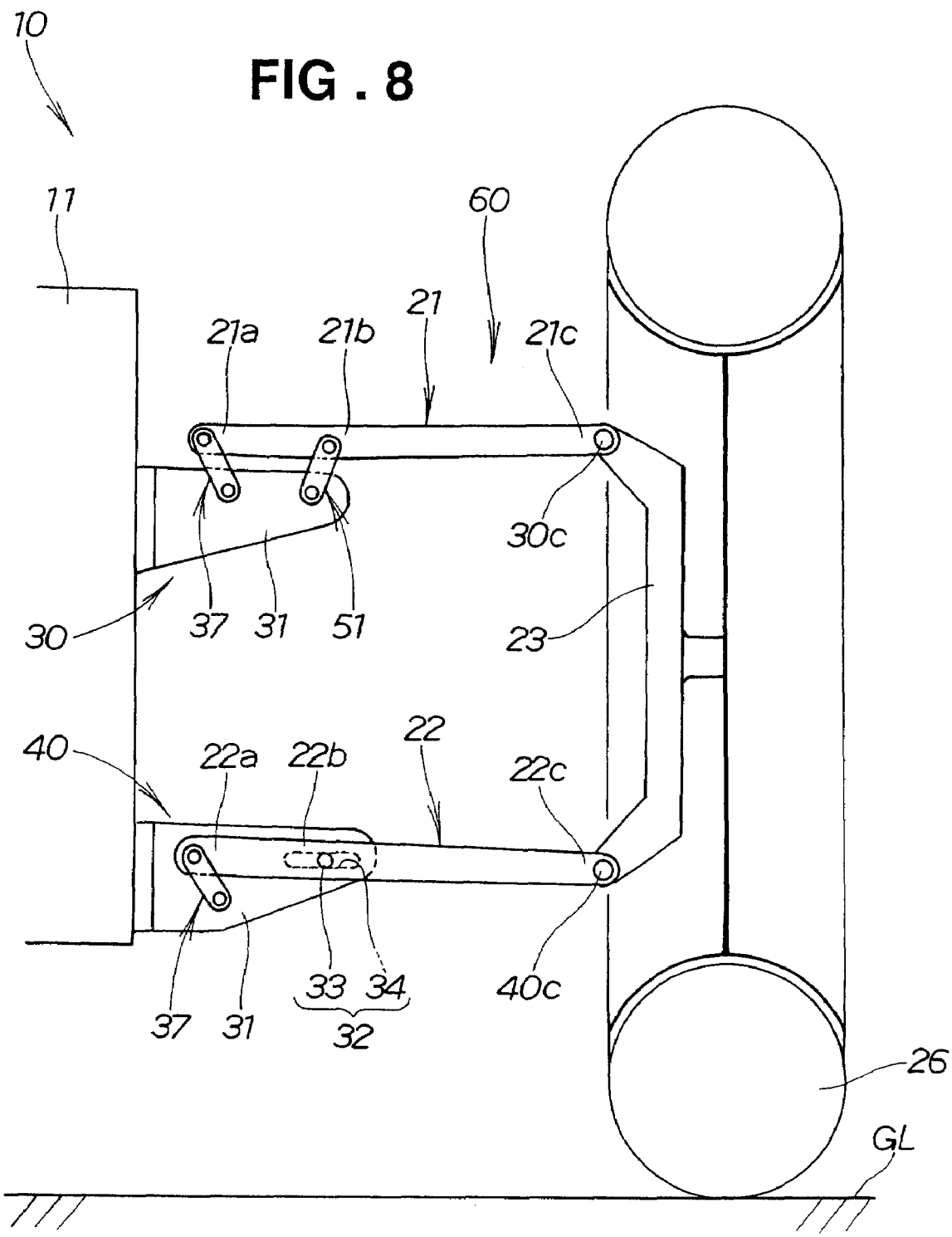
FIG. 8 is a schematic view of a right vehicular suspension system in a third embodiment of the present invention.
Figure 9:
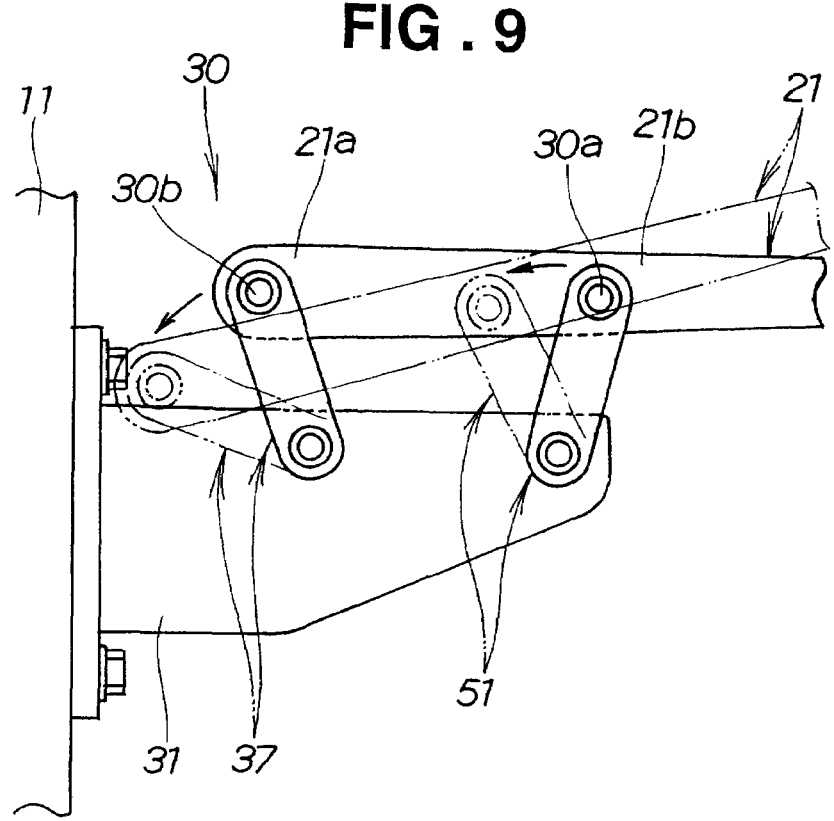
FIG. 9 is a view showing an arrangement of an upper connecting unit shown in FIG. 8.
Figure 10:
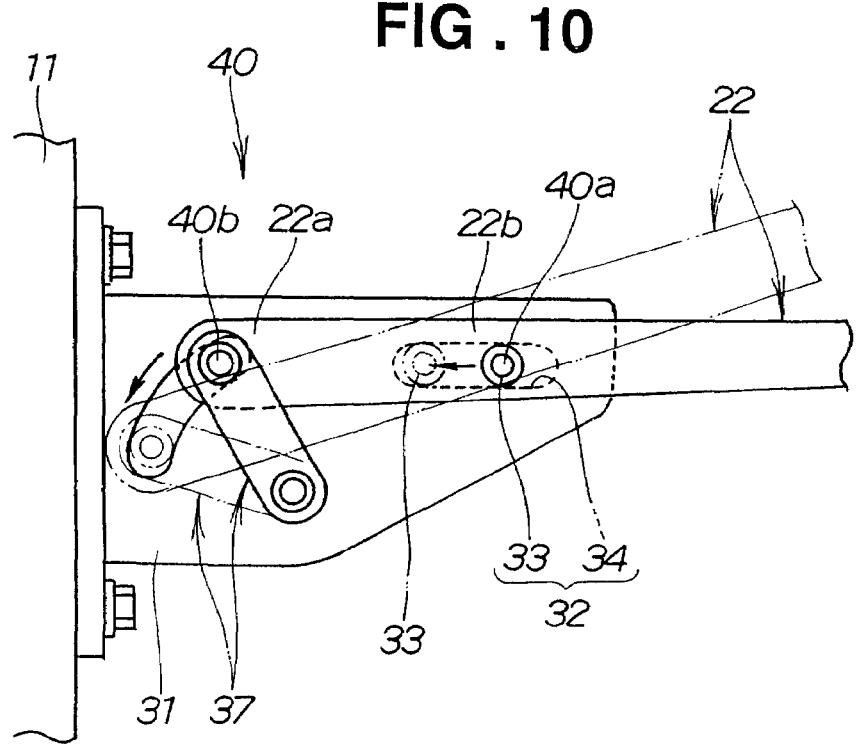
FIG. 10 is a view showing an arrangement of a lower connecting unit shown in FIG. 8.

FIG. 8 through FIG. 10 each show a vehicular suspension system 60 in the third embodiment of the present invention.

As shown in FIG. 8 and FIG. 9, the suspension system 60 is arranged such that retention means 51 of an upper connecting unit 30 is provided as a swing arm and conversion means 37 of the upper connecting unit 30 is provided as a camber control arm.

The swing arm 51 (i.e., the retention means 51) is identical in arrangement to the retention means 51 shown in FIG. 7.

The camber control arm 37 (i.e., the conversion means 37) is basically identical in arrangement to the conversion means 37 shown in FIG. 7. More specifically, the camber control arm 37 of the upper connecting unit 30 extends upwardly. The camber control arm 37 is connected at a proximal end portion thereof to a side surface of a bracket 31 in such a manner as to pivot in a lateral direction of a vehicle body 11. The camber control arm 37 is connected at a distal end portion thereof to a proximal end portion 21a of an upper arm 21.

As shown in FIG. 8 and FIG. 10, the suspension system 60 is arranged such that retention means 32 of a lower connecting unit 40 is slidable and the conversion means 37 of the lower connecting unit 40 is provided as a camber control arm.

The retention means 32 of the lower connecting unit 40 is identical in arrangement to the retention means 32 shown in FIG. 3. The camber control arm 37 of the lower connecting unit 40 is basically identical in arrangement to the conversion means 37 shown in FIG. 9.

The suspension system 60 in the third embodiment is operated in the same manner as the suspension system 20 in the first embodiment.

The upper connecting unit 30 includes the bracket 31, the retention means 51 assembled to the bracket 31, and the conversion means 37 assembled to the bracket 31. The lower connecting unit 40 includes the bracket 31, the retention means 32 assembled to the bracket 31, and the conversion means 37 assembled to the bracket 31. In other words, the retention means 32, 51 and the conversion means 37, 37 are assembled to the vehicle body 11 by means of the bracket 31.

Figure 11:
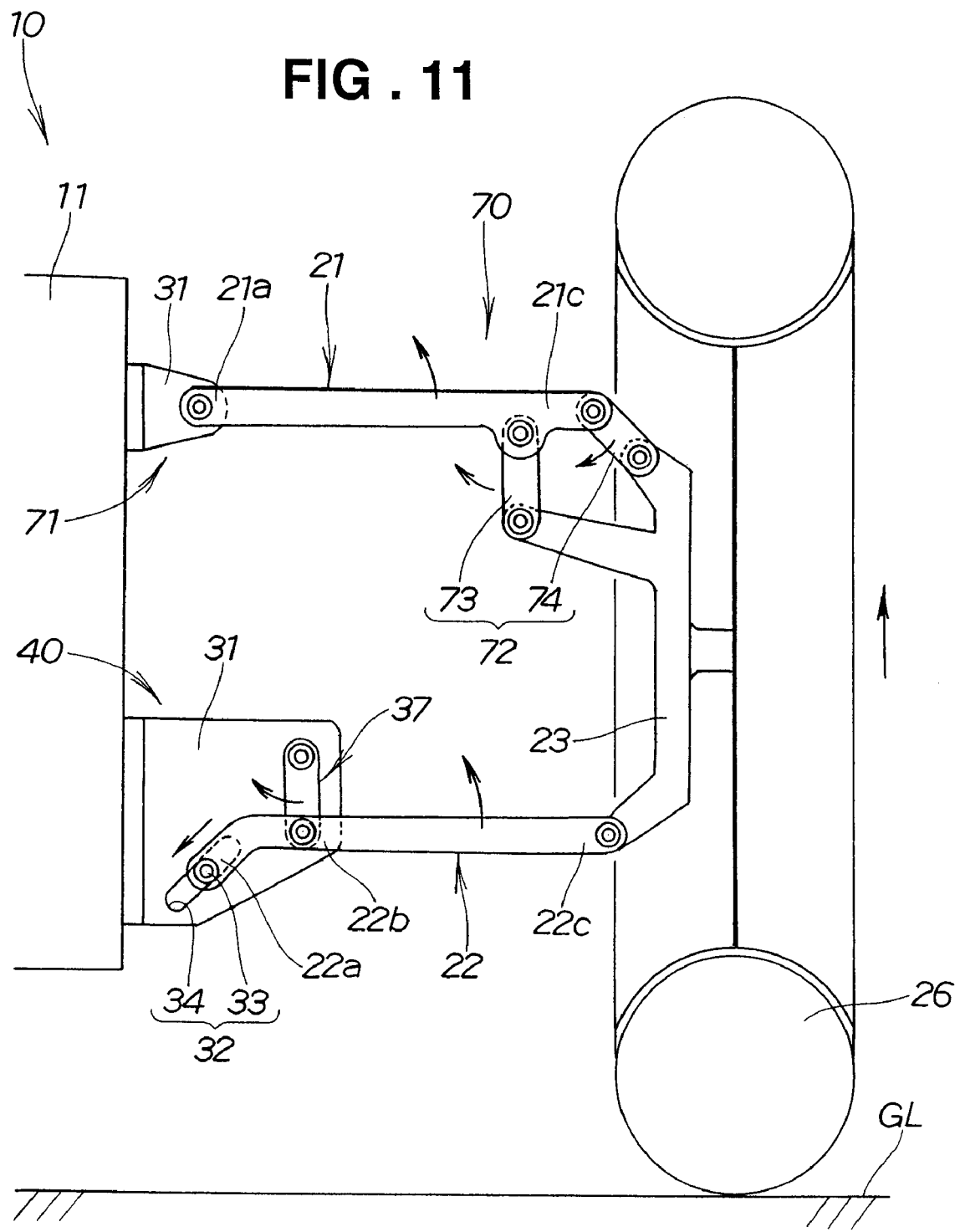
FIG. 11 is a schematic view of a right vehicular suspension system in a fourth embodiment of the present invention.

FIG. 11 shows a vehicular suspension system 70 in the fourth embodiment of the present invention.

As shown in FIG. 11, the suspension system 70 is arranged such that a bracket 31 constituting an upper connecting member 71 is attached to a vehicle body 11. An upper arm 21 is connected at a proximal end portion 21a thereof to the bracket 31 in such a manner as to pivot up and down. The upper arm 21 has a distal end portion 21c retaining an upper portion of a knuckle 23 through a camber controlling link mechanism 72.

The camber controlling link mechanism 72 includes a pair of right and left links 74, 73 connected to the distal end portion 21c of the upper arm 21 in such a manner as to pivot in a lateral direction of the vehicle body 11. The links 73, 74 extend downwardly and connected at their distal end portions to the upper portion of the knuckle 23.

As shown in FIG. 11, the suspension system 70 is also arranged such that retention means 32 of a lower connecting unit 40 is slidable and conversion means 37 of the lower connecting unit 40 is provided as a camber control arm.

The retention means 32 is basically identical in arrangement to the retention means 32 shown in FIG. 3. The retention means 32 includes a projection 33 provided on a proximal end portion 22a of a lower arm 22, and an elongated hole 34 provided on a side surface of a bracket 31. The elongated hole 34 extends inwardly laterally of the vehicle body 31 in a downwardly slanted position. The proximal end portion 22a of the lower arm 22 extends inwardly laterally of the vehicle body 11 in a downwardly slanted position.

The camber control arm 37 is basically identical in arrangement to the conversion means 37 shown in FIG. 3 and has a distal end portion connected to an intermediate portion 22b of the lower arm 22.

The suspension system 70 in the fourth embodiment is operated in the same manner as the suspension system 20 in the first embodiment.

The suspension system 70 may be altered such that the retention means 32 may act as slidable conversion means and the conversion means 37 may act as retention means provided as a camber control arm.

Figure 12:
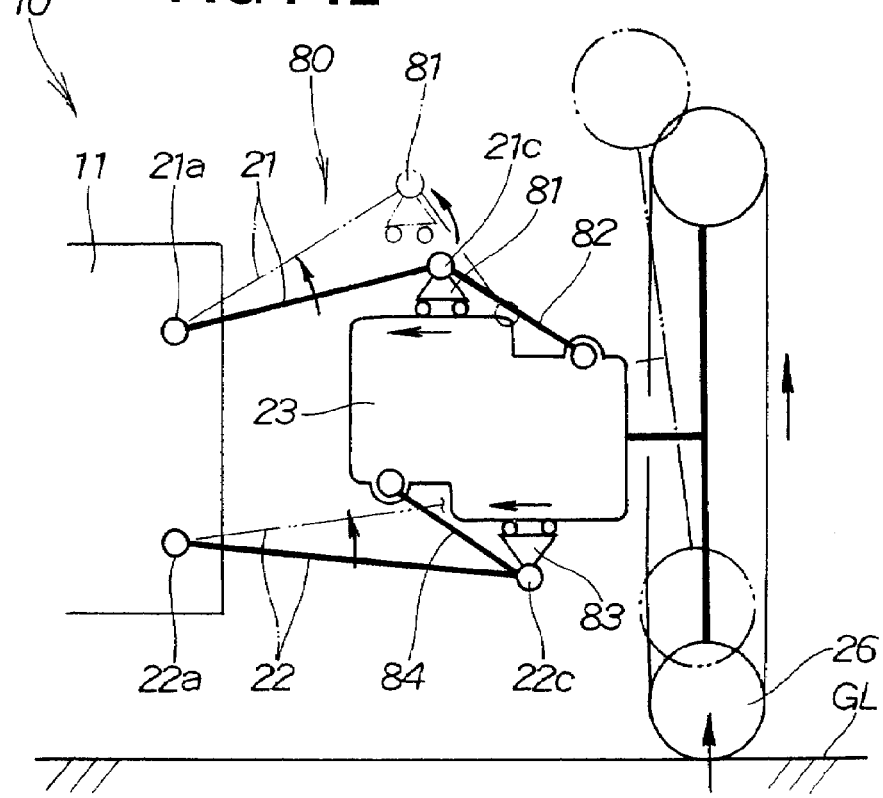
FIG. 12 is a schematic view of a right vehicular suspension system in a fifth embodiment of the present invention.

FIG. 12 shows a vehicular suspension system 80 in the fifth embodiment of the present invention.

As shown in FIG. 12, the suspension system 80 has the following three features: (1) an upper arm 21 is connected at a proximal end portion 21a thereof directly to a vehicle body 11 in such a manner as to pivot up and down while a lower arm 22 is connected at a proximal end portion 22a thereof directly to the vehicle body 11 in such a manner as to pivot up and down; (2) the upper arm 21 has a distal end portion 21c retaining an upper portion of a knuckle 23 through upper retention means 81 and upper conversion means 82; and (3) the lower arm 22 has a distal end portion 22c retaining a lower portion of the knuckle 23 through lower retention means 83 and lower conversion means 84.

The upper retention means 81 is basically identical in arrangement to the retention means 32 shown in FIG. 3, and includes a projection 33 provided on the distal end portion 21c of the upper arm 21 and an elongated hole 34 provided on the knuckle 23.

The upper conversion means 82 is provided as a camber control arm basically identical in arrangement to the conversion means 37 shown in FIG. 3. The camber control arm 82 interconnects the distal end portion 21c of the upper arm 21 and an upper end portion of the knuckle 23 located on a side of a wheel 26.

The lower retention means 83 is basically identical in arrangement to the retention means 32 shown in FIG. 3, and includes a projection (see FIG. 3) 33 provided on the distal end portion 22c of the lower arm 22 and an elongated hole 34 (see FIG. 3) provided on the knuckle 23.

The lower conversion means 84 is provided as a camber control arm basically identical in arrangement to the conversion means 37 shown in FIG. 3. The camber control arm 84 interconnects the distal end portion 22c of the lower arm 22 and a lower end portion of the knuckle 23 located on a side of the vehicle body 11.

The suspension system 80 in the fifth embodiment is operated in the same manner as the suspension system 20 in the first embodiment.

Figure 13:
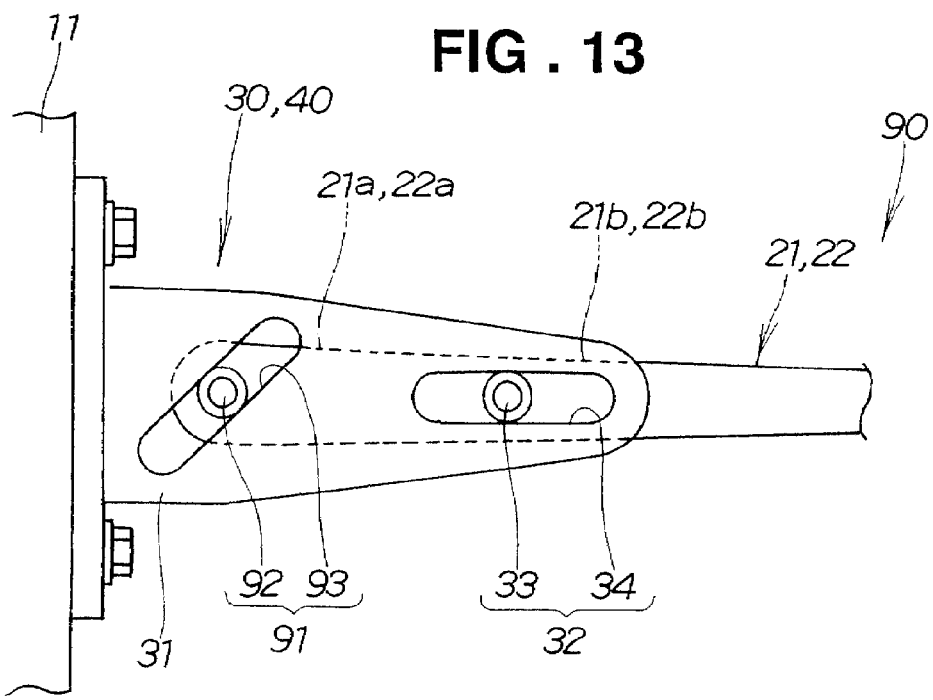
FIG. 13 is a view showing an arrangement of each of upper and lower connecting units of a right vehicular suspension system in a sixth embodiment of the present invention.

FIG. 13 shows a vehicular suspension system 90 in the sixth embodiment of the present invention.

As shown in FIG. 13, the suspension system 90 is arranged such that each of upper and lower connecting units 30, 40 includes retention means 32 and conversion means 91 both of which are slidable.

The retention means 32 of the upper connecting unit 30 is identical in arrangement to the retention means 32 shown in FIG. 3. The conversion means 91 includes an engaging projection 92 provided on a proximal end portion 21a of an upper arm 21, and an elongated hole 93 within which the engaging projection 92 is retained in such a manner as to shift in a lateral direction of a vehicle body 11. The engaging projection 92 is provided as a roller rotatably attached to a side surface of the upper arm 21. The elongated hole 93 is provided on a side surface of a bracket 31 and extends inwardly laterally of the vehicle body 11 in a downwardly slanted position.

The lower connecting unit 40 is identical in arrangement to the upper connecting unit 30.

The suspension system 90 in the sixth embodiment is operated in the same manner as the suspension system 20 in the first embodiment.

Figure 14:
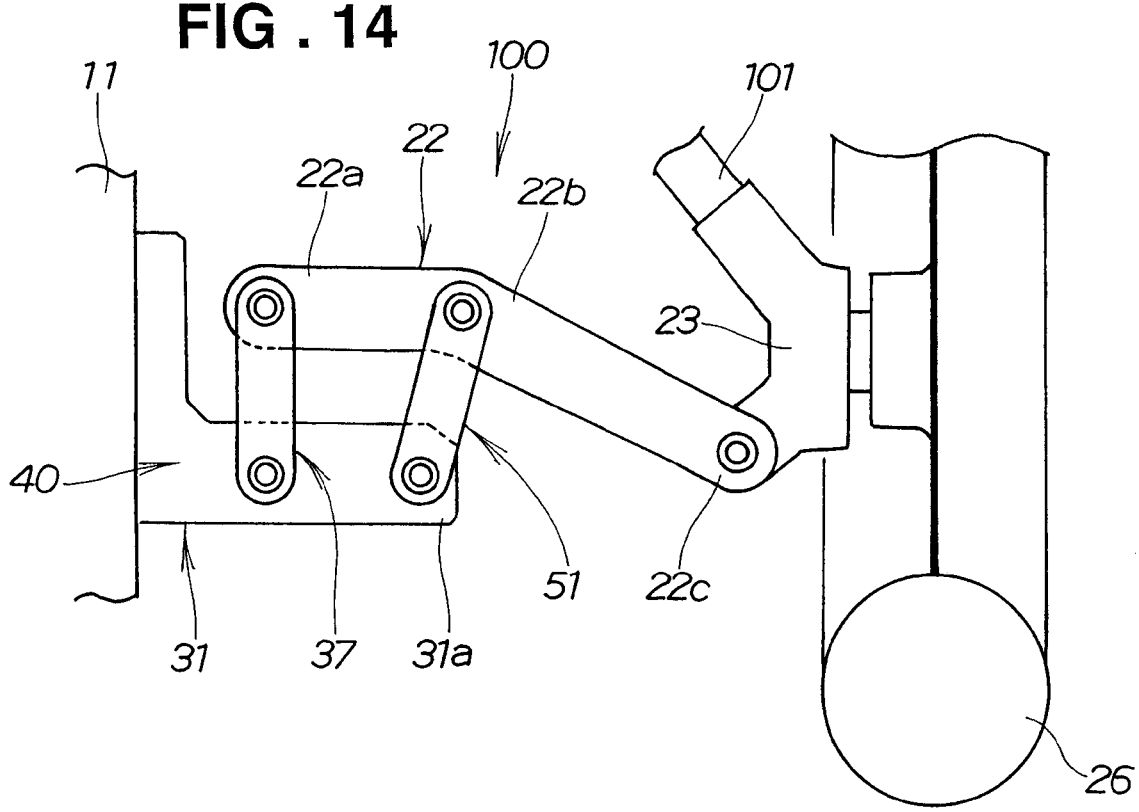
FIG. 14 is a view showing an arrangement of a lower connecting unit of a right vehicular suspension system in a seventh embodiment of the present invention.

FIG. 14 shows a vehicular suspension system 100 in the seventh embodiment of the present invention.

As shown in FIG. 14, the suspension system 100 is provided as a strut-type suspension. More specifically, the suspension system 100 is arranged such that a bracket 31 of a lower connecting unit 40 extends from a vehicle body 11 to a vicinity of a knuckle 23. The bracket 31 has an extension 31a carrying retention means 51 and conversion means 37. Reference numeral 101 denotes a strut.

The retention means 51 and the conversion means 37 are identical in arrangement to the retention means 51 show in FIG. 9 and the conversion means 37 shown in FIG. 9, respectively.

In the suspension system 100, a length of a lower arm 22 defined between a proximal end portion 22a of the lower arm 22 and a distal end portion 22c of the lower arm 22 is shorter.

The provision of the shorter length of the lower arm 22 enables a point of connection of the lower arm 22 and the knuckle 23 to move in a gently curved line.

The suspension system 100 in the seventh embodiment is operated in the same manner as the suspension system 20 in the first embodiment.

Figure 15:
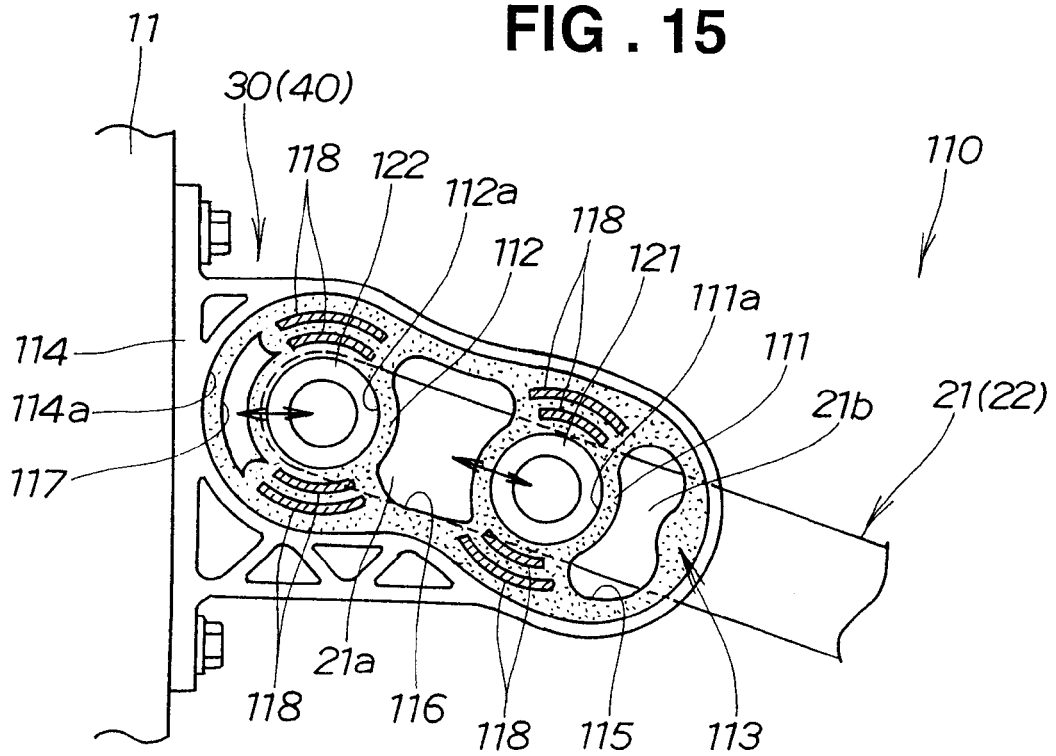
FIG. 15 is a view showing an arrangement of an upper or lower connecting unit of a right vehicular suspension system in a eighth embodiment of the present invention.
Figure 16:
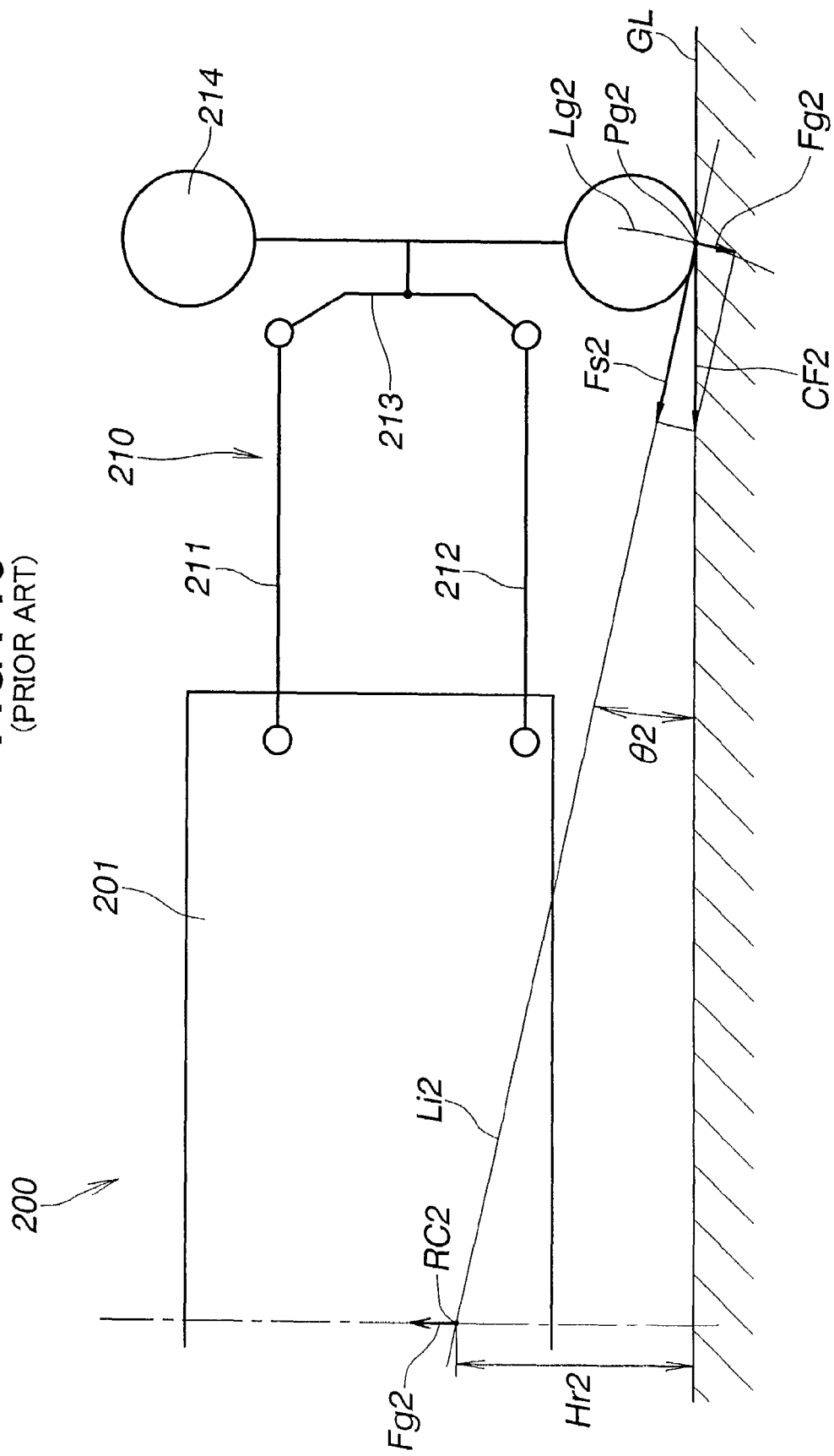
FIG. 16 is a schematic view of a vehicle including conventional suspension systems.

FIG. 15 shows a vehicular suspension system 110 in the eighth embodiment of the present invention.

As shown in FIG. 15, the suspension system 110 is arranged such that retention means 111 and conversion means 112 of an upper connecting unit 30 are made of rubber.

More specifically, the retention means 111 is provided as a first rubber portion retaining an intermediate portion 21b of an upper arm 21. The first rubber portion 111 is elastically deformable only in a longitudinal direction of the upper arm 21. The conversion means 112 is provided as a second rubber portion retaining an end portion 21a (a proximal end portion 21a) of the upper arm 21 located on a side of a vehicle body 11. The second rubber portion 112 is elastically deformable only in a lateral direction of the vehicle body 11. The first rubber portion 111 and the second rubber portion 112 (i.e., the retention means 111 and the conversion means 112) are formed integrally with each other and define a rubber member 113.

A metal bracket 114 attached to the vehicle body 11 has a recessed portion 114a extending in the lateral direction of the vehicle body 11. The rubber member 113 is fitted to the recessed portion 114a.

The rubber member 113 has hollow portions 115, 116, 117 formed in portions other than the first rubber portion 111 (retention means 111) and the second rubber portion 112 (the conversion means 112). More specifically, the hollow portion 115 is formed between the first rubber portion 111 and an end portion of the rubber member 113 located on a side of a knuckle 23 (see FIG. 2). The hollow portion 116 is formed between the rubber portion 111 and the second rubber portion 112. The hollow portion 117 is formed between the second rubber portion 112 and an end portion of the rubber member 113 located on a side of the vehicle body 11. The first rubber portion 111 and the second rubber portion 112 are displaceable only in a direction in which the hollow portions 115, 116, 117 are arranged.

The first rubber portion 111 has metal inserts 118 embedded in a top and a bottom thereof while the second rubber portion 112 has metal inserts 118 embedded in a top and a bottom thereof. The embedment of the metal inserts 118 in the top and bottom of each of the first rubber portion 111 and the second rubber portion 112 is achieved by insert molding. The metal inserts 118 restrain the first rubber portion 111 and the second rubber portion 112 from being displaced in an up-and-down direction of the rubber member 113.

The first rubber portion 111 has a first hole 111a within which a first engaging projection 121 provided on the intermediate portion 21b of the upper arm 21 is fitted. The second rubber portion 112 has a second hole 112a within which a second engaging projection 122 provided on the proximal end portion 21a of the upper arm 21 is fitted.

It is to be noted that a lower arm 22 and a lower connecting unit 40 are identical in arrangement to the upper arm 21 and the upper connecting unit 30.

The suspension system 110 in the eighth embodiment is operated in the same manner as the suspension system 20 in the first embodiment.

The suspension system 110 may be altered such that the retention means 111 retains one of the intermediate portion 21b of the upper arm 21 and an intermediate portion 22b of the lower arm 22. Also, the conversion means 112 may be provided to retain one of the end portion 21a of the upper arm 21 and an end portion 22a of the lower arm 22 located on the side of the vehicle body 11.

The suspension system of the present invention is not limited to a double wishbone suspension, but includes any type of a suspension, such as a strut-type suspension, for providing a controlled camber of a wheel.

The retention means and the conversion means may be carried not only on the upper arm and the lower arm, but also on toe control arms, steering tie rods, stabilizers and other links.

The retention means and the conversion means may be provided to either one of a portion of each arm on a side of a vehicle body and a portion of each arm on a side of a knuckle or both. Also, the retention means and the conversion means may be provided to any component pivotable when the suspension system moves.

The various components of the respective suspension systems 20, 50 60, 70, 80, 90, 100, 110 may be combined to provide suspension systems suitable for various vehicles.

Obviously, various minor changes and modifications of the present invention are possible in the light of the above teaching. It is therefore to be understood that within the scope of the appended claims the invention may be practiced otherwise than as specifically described.

What is claimed is:

1. A suspension system for a vehicle, comprising:
a knuckle for rotatably retaining a wheel of the vehicle;
an upper arm vertically pivotally connected to a body of the vehicle for retaining an upper portion of the knuckle;
a lower arm vertically pivotally connected to the vehicle body for retaining a lower portion of the knuckle;
retention means for retaining the upper arm and the lower arm movably laterally of the vehicle body; and
conversion means for converting the vertical pivotal movements of the upper arm and the lower arm into lateral displacements.

2. A suspension system according to claim 1, wherein the conversion means comprises a camber control arm for connecting at least one of vehicle-body-side ends of the upper and lower arms to the vehicle body, and wherein the camber control arm is pivotable in such a direction as to draw the upper- and lower-arm ends toward the vehicle body in response to the vertical pivotal movements of the upper and lower arms.

3. A suspension system according to claim 1, wherein the upper arm and the lower arm have an intermediate portion, at least one of the intermediate portions forming an engaging projection of the retention means, and wherein the retention means has an elongated hole for allowing engagement of the engaging projection movably laterally of the vehicle body.

4. A suspension system according to claim 1, wherein the vehicle body has an engaging projection forming the retention means, and wherein the upper and lower arms have an intermediate portion, at least one of the intermediate portions having an elongated hole for allowing engagement of the engaging projection movably laterally of the vehicle body.

5. A suspension system according to claim 1, wherein the retention means comprises a swing arm for connecting at least one of intermediate portions of the upper arm and the lower arm to the vehicle body, and wherein the swing arm is pivotable in such a manner as to move the intermediate portion laterally of the vehicle body in response to the vertical pivotal movements of the upper and lower arms.

6. A suspension system according to claim 1, wherein the retention means comprises a first rubber portion for retaining an intermediate portion of one of the upper and lower arms, the first rubber portion being elastically deformable only in a longitudinal direction of the one of the upper and lower arms, and wherein the conversion means comprises a second rubber portion for retaining one of vehicle-body-side ends of the upper and lower arms, the second rubber portion being elastically deformable only in the lateral direction of the vehicle body, the first rubber portion and the second rubber portion being formed integrally with each other.

* * * * *